(12) United States Patent
Song et al.

(10) Patent No.: US 8,823,441 B1
(45) Date of Patent: *Sep. 2, 2014

(54) LOW POWER, LOW VOLTAGE PHASE INTERPOLATOR

(71) Applicant: Marvell International Ltd., Hamilton (BM)

(72) Inventors: Yonghua Song, Cupertino, CA (US); Hui Wang, Pleasanton, CA (US); Zubir Adal, Union City, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,045

(22) Filed: Sep. 16, 2013

Related U.S. Application Data

(63) Continuation of application No. 13/550,514, filed on Jul. 16, 2012, now Pat. No. 8,536,927, which is a continuation of application No. 11/006,189, filed on Dec. 6, 2004, now Pat. No. 8,228,110.

(51) Int. Cl.
*G06F 7/44* (2006.01)

(52) U.S. Cl.
USPC ............ 327/359; 327/247; 327/251; 327/253

(58) Field of Classification Search
USPC ................................. 327/247, 251, 253, 359
See application file for complete search history.

(56) References Cited

U.S. PATENT DOCUMENTS

| | | | |
|---|---|---|---|
| 6,002,279 A | 12/1999 | Evans et al. | |
| 6,107,848 A | 8/2000 | Pickering et al. | |
| 6,359,486 B1 | 3/2002 | Chen | |
| 6,377,094 B1 | 4/2002 | Carley | |
| 6,597,212 B1 | 7/2003 | Wang et al. | |
| 6,621,312 B2 | 9/2003 | Tang et al. | |
| 6,674,314 B2 | 1/2004 | Takai | |
| 6,892,061 B2 * | 5/2005 | Asam | 455/313 |
| 6,933,766 B2 * | 8/2005 | Khlat et al. | 327/359 |
| 6,943,606 B2 | 9/2005 | Dunning et al. | |
| 7,088,982 B1 * | 8/2006 | Chien | 455/326 |
| 7,135,905 B2 | 11/2006 | Teo et al. | |
| 7,266,169 B2 | 9/2007 | Zhang | |
| 8,228,110 B1 | 7/2012 | Song | |
| 8,536,927 B1 * | 9/2013 | Song et al. | 327/359 |
| 2003/0002607 A1 | 1/2003 | Mooney et al. | |
| 2003/0183842 A1 | 10/2003 | Kizer et al. | |

OTHER PUBLICATIONS

IEEE Computer Society, "*IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications*", IEEE Std 802.3-2002.

* cited by examiner

*Primary Examiner* — Kenneth B. Wells

(57) ABSTRACT

A method includes, in at least one aspect, selecting a first phase signal, where the first phase signal concurrently enables a first pair of switching elements; selecting a second phase signal, where the second phase signal concurrently enables a second pair of switching elements; and generating an interpolated phase signal by providing a connection between a switching element of the first pair of switching elements to an output node and providing a connection between a switching element of the second pair of switching elements to the output node.

21 Claims, 3 Drawing Sheets

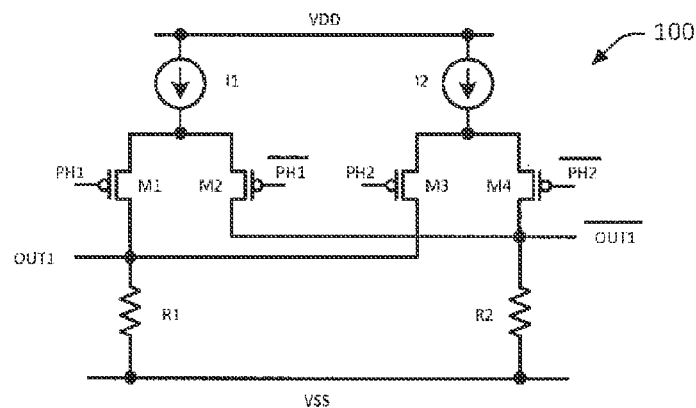
FIG. _ 1
PRIOR ART
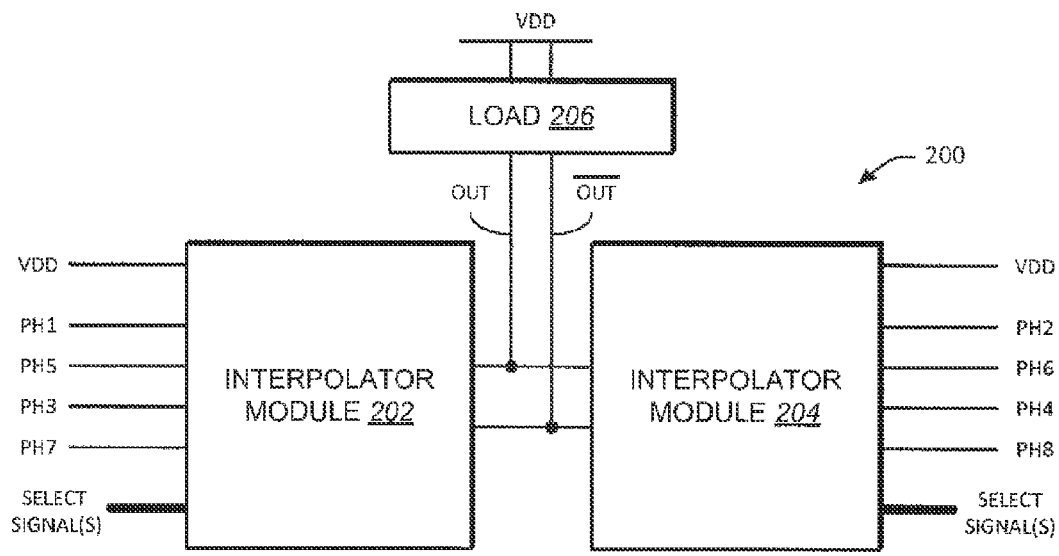
FIG. _ 2

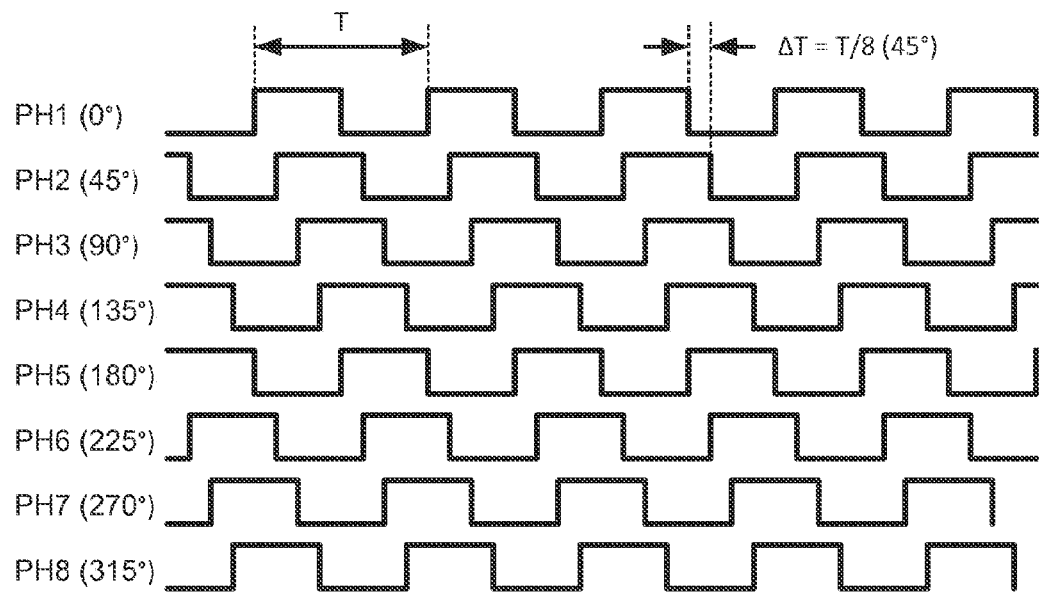
FIG. _ 3
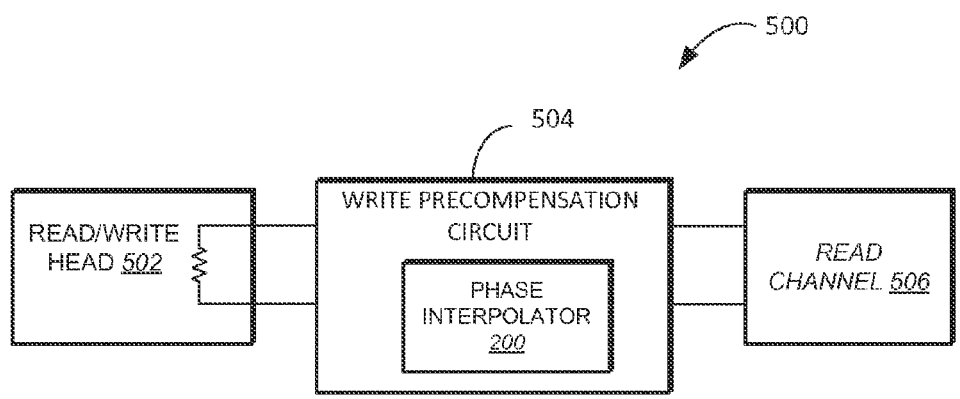
FIG. _ 5

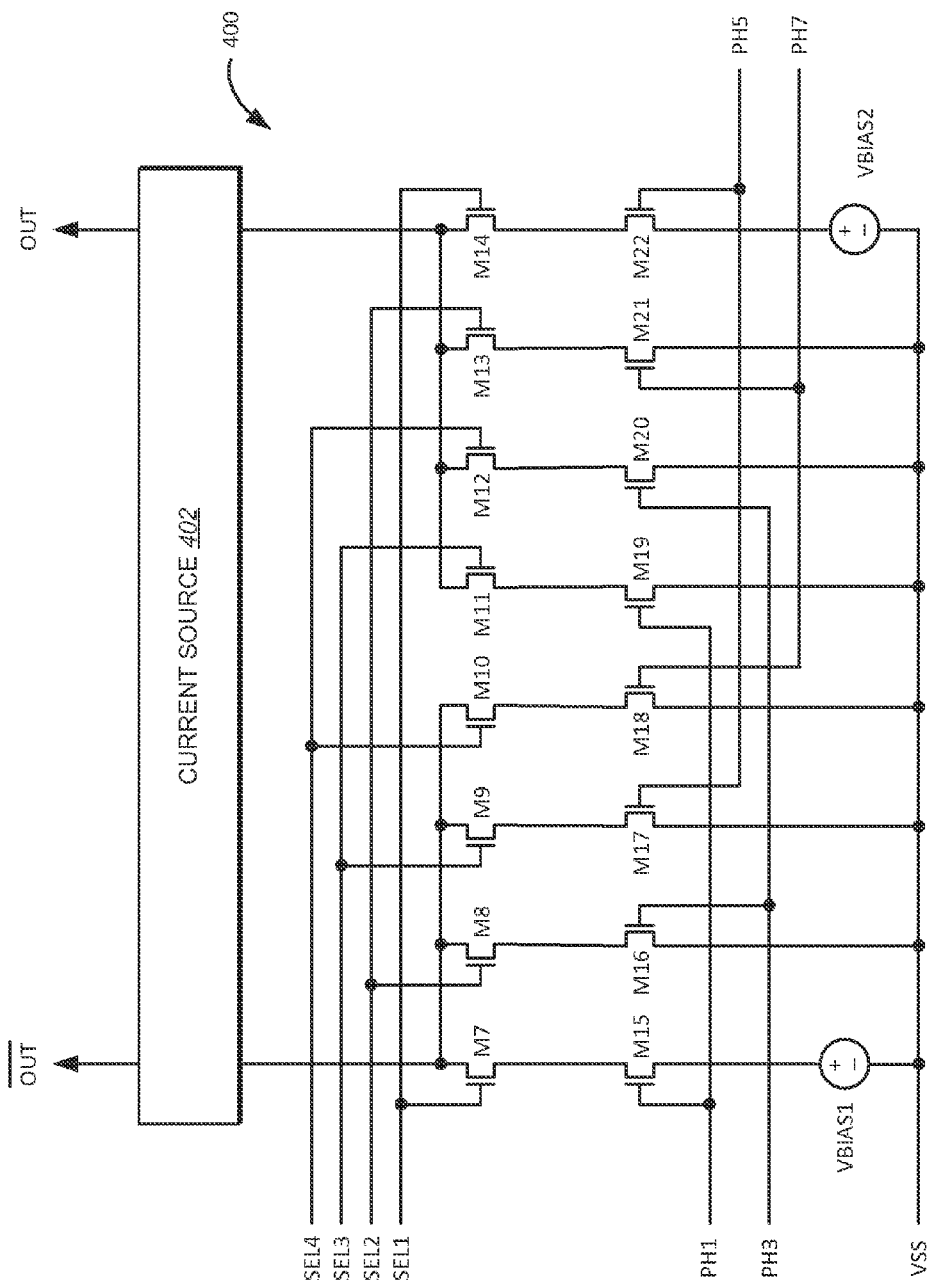
FIG._4

LOW POWER, LOW VOLTAGE PHASE INTERPOLATOR

CROSS REFERENCE TO RELATED APPLICATIONS

This disclosure is a continuation application of and claims the benefit of priority of U.S. application Ser. No. 13/550,514, filed on Jul. 16, 2012, issued on Sep. 17, 2013, as U.S. Pat. No. 8,536,927, and titled "LOW POWER, LOW VOLTAGE PHASE INTERPOLATOR," which is a continuation application of and claims the benefit of priority of U.S. application Ser. No. 11/006,189, filed on Dec. 6, 2004, issued on Jul. 24, 2012, as U.S. Pat. No. 8,228,110, and titled "LOW POWER, LOW VOLTAGE PHASE INTERPOLATOR," the disclosures of which are hereby incorporated by reference in their entirety.

BACKGROUND

The following disclosure relates to electrical circuits and signal processing. A phase interpolator is a circuit that can be used within an integrated circuit to adjust a phase of a signal (e.g., a clock signal). A phase interpolator can be used in a variety of applications. For example, a phase interpolator can be implemented within a receiver to adjust a phase of a sampling clock, or within a write precompensation circuit (e.g., of a hard disk drive system) to adjust a phase of a write clock.

FIG. 1 shows one example of a conventional phase interpolator 100. Phase interpolator 100 includes a differential pair having a pair of differential inputs PH1, PH1Bar (complement of PH1), PH2, PH2Bar (complement of PH2), and differential outputs OUT1, OUT1 Bar (complement of OUT1). Phase interpolator 100 includes bias currents I1-I2, transistors M1-M4, and resistors R1-R2. In general, phase interpolator 100 provides a phase shift for a signal that is an interpolation between phase signals PH1 and PH2. Phase interpolator 100 provides the phase shift based on bias currents I1 and I2. For example, if bias current I1 is turned off, then phase interpolator 100 provides an output signal OUT1 having a phase that is substantially equal to that of phase signal PH2. And if bias currents I1 and I2 are substantially equal, then phase interpolator 100 provides an output signal OUT1 having a phase that is substantially in between those of phase signals PH1 and PH2.

As bias current I1 or I2 is changed, a common mode component of output signals OUT1 and OUT1 Bar varies, and phase interpolator 100 therefore requires a certain amount of time to settle in order to provide an output signal having an accurate phase shift. In addition, phase interpolator 100 may require a large buffer to drive each of phase signals PH1, PH1Bar, PH2 and PH2Bar. Such buffers typically require a large power supply (e.g., greater than 1.5 Volts). A change in a bias condition (e.g., including a large power supply) can impact interpolator linearity.

SUMMARY

In general, in one aspect, this specification describes a phase interpolator that is operable to provide an interpolated output signal through an output node. The phase interpolator includes a first and second interpolator module, each having an output in communication with the output node. The first interpolator includes an input to receive a first plurality of input phase signals, and a selector to select one or more of the first plurality of input phase signals for interpolation at the output node of the phase interpolator. The second interpolator module includes an input to receive a second plurality of input phase signals, and a selector to select one or more of the second plurality of input phase signals for interpolation at the output node of the phase interpolator. Each of the selected ones of the first plurality of input signals and each of the selected ones of the second plurality of input signals are included in the interpolated output signal.

Particular implementations can include one or more of the following. The first interpolator module and the second interpolator module can each include one or more interpolator core cells. Each interpolator core cell can be operable to provide a single instance of a given input phase signal to the output node for interpolation. Each interpolator core cell can receive as inputs one or more select signals operable to select a given input phase signal to be provided to the output node. Each interpolator core cell can include only NMOS or PMOS transistors. The selector in the first interpolator module and the selector in the second interpolator module can be substantially in common. The phase interpolator can operate using a power supply that is less than 1.2 Volts. Each of the first plurality of input phase signals can have a different phase relative to other ones of the first plurality of input phase signals. Each of the second plurality of input phase signals can have a different phase relative to other ones of the second plurality of input phase signals. The first plurality of input phase signals, the second plurality of input phase signals, and the interpolated output signal can be differential signals.

The phase interpolator can further include a third interpolator module having an output in communication with each of the output of the first interpolator module and the output of the second interpolator module. The third interpolator module can include an input to receive a third plurality of input phase signals, and a selector to select one or more of the third plurality of input phase signals for interpolation at the output node of the phase interpolator.

In general, in another aspect, this specification describes a phase interpolator operable to provide an interpolated output signal through an output node. The phase interpolator includes a first and second interpolator module, each having an output in communication with the output node. The first interpolator includes a plurality of first switches to receive a corresponding first plurality of input phase signals, and a plurality of second switches in communication with corresponding ones of the first plurality of switches. Each of the plurality of second switches are operable to assert one or more of the first plurality of input phase signals for interpolation at the output node of the phase interpolator. The second interpolator module includes a plurality of third switches to receive a corresponding second plurality of input phase signals, and a plurality of fourth switches in communication with corresponding ones of the third switches. Each of the plurality of fourth switches are operable to assert one or more of the second plurality of input phase signals for interpolation at the output node of the phase interpolator. Each of the asserted ones of the first plurality of input signals and each of the asserted ones of the second plurality of input signals are included in the interpolated output signal.

Particular implementations can include one or more of the following. Each of the first, second, third and fourth transistors can comprise only NMOS or PMOS transistors. The interpolated output signal can be provided to a load. The load can be associated with one or more of a serial ATA (Advanced Technology Architecture) communication system, a read channel, a fiber channel, a wireless baseband communication system, an ethernet XAUI SERDES transceiver, a 1000 BaseTx network, a USB (Universal Serial Bus) 2.0 bus, or a PCI Express bus.

In general, in another aspect, this specification describes a disk drive system. The disk drive system includes a read channel configured to provide a data stream to be recorded onto a surface of a disk, and a write precompensation circuit operable to precompensate each data bit of the data stream. The write precompensation circuit includes a phase interpolator operable to provide a predetermined delay (through an output node) of a write clock to precompensate each data bit of the data stream. The phase interpolator includes a first and second interpolator module, each having an output in communication with the output node. The first interpolator includes an input to receive a first plurality of input phase signals, and a selector to select one or more of the first plurality of input phase signals for interpolation at the output node of the phase interpolator. The second interpolator module includes an input to receive a second plurality of input phase signals, and a selector to select one or more of the second plurality of input phase signals for interpolation at the output node of the phase interpolator. Each of the selected ones of the first plurality of input signals and each of the selected ones of the second plurality of input signals are included in the interpolated output signal. The disk drive system further includes a read/write head operable to write the precompensated data bits onto the surface of the disk.

Implementations can include one or more of the following advantages. A phase interpolator circuit is provided that consumes low power. In one implementation, the phase interpolator circuit operates based on a power supply that is substantially 1.2 Volts or lower.

In one implementation, a phase interpolator is provided that includes plural interpolator modules. Each interpolator module is designed so that only the output(s) of each interpolator module need be in communication with one another. To increase a resolution of the phase interpolator, additional interpolator modules can be added to the phase interpolator including coupling each additional interpolator module to the output(s) of the phase interpolator. Such a modular design reduces complexities in layout of a high resolution phase interpolator. In addition, a high resolution phase interpolator can be implemented within a smaller area of an integrated circuit chip relative to conventional phase interpolator designs.

The details of one or more implementations are set forth in the accompanying drawings and the description below. Other features and advantages will be apparent from the description and drawings, and from the claims.

DESCRIPTION OF DRAWINGS

FIG. 1 is a schematic diagram of a conventional phase interpolator.

FIG. 2 is block diagram of a phase interpolator.

FIG. 3 is a timing diagram illustrating the input phase signals of the phase interpolator of FIG. 2.

FIG. 4 is a schematic diagram of an interpolator core cell within an interpolation module of FIG. 2.

FIG. 5 is a schematic block diagram of a hard disk drive system.

Like reference symbols in the various drawings indicate like elements.

DETAILED DESCRIPTION

FIG. 2 illustrates a block diagram of a phase interpolator 200. In one implementation, phase interpolator 200 includes circuitry for generating differential output signals OUT, OUTBar (complement of OUT) having a phase that is shifted relative to those of one or more differential input phase signals (e.g., phase signals PH1-PH8). Differential output signals OUT, OUTBar can be provided to load 206. Load 206 can be associated with a variety of applications. For example, example applications include a serial ATA (Advanced Technology Architecture) communication system, an Ethernet XAUI SERDES transceiver, a 1000 BaseTx network, a USB (Universal Serial Bus) 2.0 bus, a PCI Express bus, and so on.

Phase interpolator 200 includes multiple interpolator modules, and, specifically, in the implementation shown, two interpolator modules 202, 204 are included. Though two interpolation modules 202, 204 are illustrated in FIG. 2 by way of example, phase interpolator 200 can contain additional interpolator modules. Each interpolator module contains one or more interpolator core cells (not shown) that are each operable to output a selected differential input phase signal for interpolation at outputs OUT, OUTBar, as discussed in greater detail below.

Interpolator module 202 receives as inputs differential phase signals (e.g., phase signals PH1, PH3, PH5 and PH7). Interpolator module 204 receives as inputs differential phase signals (e.g., phase signals PH2, PH4, PH6 and PH8). FIG. 3 shows a timing diagram, for one implementation, of phase signals PH1-PH8. Though (8) phase signals are shown (e.g., phase signals PH1-PH8), any number of phase signals can be interpolated through interpolator modules 202, 204. For example, in one implementation (4) phase signals are interpolated through interpolator modules 202, 204. As shown in FIG. 3, each phase signal PH1-PH8 has a delay time of $\Delta T*(i+1)$ [i=0, 1, ..., 0] with respect to phase signal PH1. In the example of FIG. 3, in which a cycle of phase signal PH1 is T, the delay time $\Delta T$ is approximately equal to T/8 (e.g., 450). Together, interpolator modules 202, 204 output differential output signals OUT, OUTBar that are an interpolation between any combination of phase signals PH1-PH8.

Each interpolator module 202, 204 is powered by a low voltage supply VDD. In one implementation, VDD is substantially equal to 1.2 Volts. Alternatively, VDD can be substantially lower than 1.2 Volts (e.g., 0.7-0.9 Volts). Unlike a conventional phase interpolator that may require a high voltage power supply, phase interpolator 200 does not require a large supply voltage in order to interpolate various phase signals.

Each interpolator module 202, 204 further receives as inputs one or more SELECT signals. Each SELECT signal is operable to select a given differential input phase signal (within a given interpolator core cell) for interpolation at outputs OUT, OUTBar, as discussed in greater detail below.

FIG. 4 illustrates one implementation of an interpolator core cell 400 within an interpolator module (e.g., interpolator module 202). Interpolator core cell 400 includes transistors M7-M22, voltage bias sources Vbias1, Vbias2, and a current source 402. In one implementation, current source 402 provides a bias current to one or more transistors within interpolator core cell 400. In one implementation, each of transistors M7-M22 are NMOS transistors or PMOS transistors.

The sources of transistors M7-M14 is in communication with the drains of transistors M15-M22, respectively. The sources of transistors M15, M22 are respectively in communication with voltage bias sources Vbias1, Vbias2. The sources of transistors M16-M21 are in communication with a low-side power supply VSS (e.g., 0 Volts). The gates of transistors M7, M14 are in communication with select signal SEL1. The gates of transistors M8, M13 are in communication with select signal SEL2. The gates of transistors M9, M11 are in communication with select signal SEL3. The gates of transistors M10, M12 are in communication with select signal SEL4. The gates of transistors M15, M19 are in communication with input phase signal PH1. The gates of transistors M16, M20 are in communication with input phase signal PH3. The gates of transistors M18, M21 are in communication with input phase signal PH7. The gates of transistors M17, M22 are in communication with input phase signal PH5. Interpolator module 204 can include a similar interpolator core cell (not shown) having as inputs, in the example shown, input phase signals PH2, PH4, PH6 and PH8.

In operation, interpolator core cell 400 is operable to output a selected differential input phase signal for interpolation at outputs OUT, OUTBar based on select signals SEL1-SEL4. For example, to provide differential input phase signals PH1 (0°) and PH5 (180°) at the outputs OUT, OUTBar, respectively, interpolator core cell 400 can operate as follows. A control circuit or a switching circuit (not shown) asserts select signal SEL1, and deasserts each of select signals SEL2-SEL4. A conventional control circuit (or selector) can be used to assert or deassert each select signal SEL1-SEL4. In response to the voltage level settings of select signals SEL1-SEL4, transistors M7 and M14 are enabled (e.g., turned on) and transistors M8-M13 are each disabled (e.g., turned off). As phase signal PH1 goes high (and phase signal PH5 goes low), a high reference voltage appears at output OUT, and a low reference voltage appears at output OUTBar. As phase signal PH1 goes low (and phase signal PH5 goes high), a low reference voltage appears at output OUT, and a high reference voltage appears at output OUTBar.

As discussed above, interpolator modules 202, 204 can each include one or more interpolator core cells (e.g., interpolator core cell 400). In one implementation, each interpolator module 202, 204 of phase interpolator 200 includes (16) interpolator core cells that are each operable to output a given differential input phase signal for interpolation at outputs OUT, OUTBar. In this implementation, phase interpolator 200 can output a differential output signal OUT, OUTBar having a phase with a resolution (e.g., step size=$\frac{1}{16}^{th}$) between any two given input phase signals (e.g., input phase signals PH1-PH8). For example, to provide an output signal OUT having a phase that is ($\frac{1}{16}^{th}$) between input phase signals PH1 and PH2, a control circuit (not shown) controls one of the (16) interpolator core cells of interpolator module 202 to provide a single instance of input phase signal PH1 at output OUT1. The control circuit also controls all (16) interpolator core cells of interpolator module 204 to provide (16) instances of input phase signal PH2 at output OUT1.

In general, each interpolator module 202, 204 can contain any number of interpolator core cells, and any number of phase input signals to provide various granularities of resolution for phase shifting a signal.

Phase interpolator 200 can be used with circuitry of a disk drive system 500, as shown in FIG. 5. Disk drive system 500 includes a read/write head 502, a write precompensation circuit 504, and a read channel 506.

In a write operation, a data stream to be recorded is provided by read channel 506 to write precompensation circuit 504. Write precompensation circuit 504 precompensates each data bit of the data stream and provides precompensated data to read/write head 502. In one implementation, phase interpolator 200 provide a predetermined delay (or phase shift) of a write clock to precompensate the data being sent to read/write head 502. Read/write head 502 locates an appropriate sector of a disk (not shown) and writes the precompensated data onto the disk.

A number of implementations have been described. Nevertheless, it will be understood that various modifications may be made without departing from the spirit and scope of the invention. For example, one or more of transistors M5-M22 can be PMOS transistors. Accordingly, other implementations are within the scope of the following claims.

What is claimed is:

1. A method, comprising:
    selecting a first phase signal, where the first phase signal concurrently enables a first pair of switching elements;
    selecting a second phase signal, where the second phase signal concurrently enables a second pair of switching elements; and
    generating an interpolated phase signal by providing a first connection between a switching element of the first pair of switching elements and a single output node concurrently with providing a second, different connection between a switching element of the second pair of switching elements and the single output node.

2. The method of claim 1, wherein
    selecting the first phase signal comprises:
        receiving a select signal, and
        selecting the first phase signal based on the received select signal; and
    selecting the second phase signal comprises:
        receiving another select signal, and
        selecting the second phase signal based on the received other select signal.

3. The method of claim 1, wherein generating the interpolated phase signal by providing the first connection between the switching element of the first pair of switching elements and the single output node concurrently with providing the second, different connection between the switching element of the second pair of switching elements and the single output node comprises:
    enabling a first switching element to provide the first connection between the switching element of the first pair of switching elements and the single output node; and
    enabling a second switching element to provide the second, different connection between the switching element of the second pair of switching elements and the single output node.

4. The method of claim 1, further comprising:
    selecting a third phase signal, where the third phase signal concurrently enables a third pair of switching elements;
    selecting a fourth phase signal, where the fourth phase signal concurrently enables a fourth pair of switching elements; and
    generating a complement of the interpolated phase signal by providing a connection between a switching element of the third pair of switching elements and another output node and providing a connection between a switching element of the fourth pair of switching elements and the other output node.

5. The method of claim 4, wherein the third phase signal is a complement of the first phase signal, and the fourth phase signal is a complement of the second phase signal.

6. The method of claim 4, wherein
    selecting the third phase signal comprises:
        receiving a select signal, and
        selecting the third phase signal based on the received select signal; and
    selecting the fourth phase signal comprises:
        receiving another select signal, and
        selecting the fourth phase signal based on the received other select signal.

7. The method of claim 4, wherein generating the complement of the interpolated phase signal by providing the connection between the switching element of the third pair of switching elements and the other output node and providing the connection between the switching element of the fourth pair of switching elements and the other output node comprises:
  enabling a third switching element to provide the connection between the switching element of the third pair of switching elements and the other output node; and
  enabling a fourth switching element to provide the connection between the switching element of the fourth pair of switching elements and the other output node.

8. An apparatus, comprising:
  a single output node to provide an interpolated phase signal; and
  an interpolator circuit configured to:
    select a first phase signal, where the first phase signal concurrently enables a first pair of switching elements;
    select a second phase signal, where the second phase signal concurrently enables a second pair of switching elements; and
    generate the interpolated phase signal by providing a first connection between a switching element of the first pair of switching elements and the single output node concurrently with providing a second, different connection between a switching element of the second pair of switching elements and the single output node.

9. The apparatus of claim 8, wherein the interpolator circuit is configured to:
  receive a select signal;
  select the first phase signal based on the received select signal;
  receive another select signal; and
  select the second phase signal based on the received other select signal.

10. The apparatus of claim 8, wherein the interpolator circuit is configured to:
  enable a first switching element to provide the first connection between the switching element of the first pair of switching elements ad the single output node; and
  enable a second switching element to provide the second, different connection between the switching element of the second pair of switching elements and the single output node.

11. The apparatus of claim 8, comprising:
  another output node to provide a complement of the interpolated phase signal,
  wherein the interpolator circuit is configured to:
    select a third phase signal, where the third phase signal concurrently enables a third pair of switching elements;
    select a fourth phase signal, where the fourth phase signal concurrently enables a fourth pair of switching elements; and
    generate the complement of the interpolated phase signal by providing a connection between a switching element of the third pair of switching elements and the other output node and providing a connection between a switching element of the fourth pair of switching elements and the other output node.

12. The apparatus of claim 11, wherein the third phase signal is a complement of the first phase signal, and the fourth phase signal is a complement of the second phase signal.

13. The apparatus of claim 11, wherein the interpolator circuit is configured to:
  receive a select signal;
  select the third phase signal based on the received select signal;
  receive another select signal; and
  select the fourth phase signal based on the received other select signal.

14. The apparatus of claim 11, wherein the interpolator circuit is configured to:
  enable a third switching element to provide the connection between the switching element of the third pair of switching elements and the other output node; and
  enable a fourth switching element to provide the connection between the switching element of the fourth pair of switching elements and the other output node.

15. A system, comprising:
  a load; and
  an interpolator circuit to provide an interpolated phase signal to the load, the interpolator circuit configured to:
    select a first phase signal, where the first phase signal concurrently enables a first pair of switching elements;
    select a second phase signal, where the second phase signal concurrently enables a second pair of switching elements; and
    generate the interpolated phase signal by providing a first connection between a switching element of the first pair of switching elements and a single output node concurrently with providing a second, different connection between a switching element of the second pair of switching elements and the single output node.

16. The system of claim 15, wherein the interpolator circuit is configured to:
  receive a select signal;
  select the first phase signal based on the received select signal;
  receive another select signal; and
  select the second phase signal based on the received other select signal.

17. The system of claim 15, wherein the interpolator circuit is configured to:
  enable a first switching element to provide the first connection between the switching element of the first pair of switching elements and the single output node; and
  enable a second switching element to provide the second, different connection between the switching element of the second pair of switching elements and the single output node.

18. The system of claim 15, wherein the interpolator circuit is configured to:
  select a third phase signal, where the third phase signal concurrently enables a third pair of switching elements;
  select a fourth phase signal, where the fourth phase signal concurrently enables a fourth pair of switching elements; and
  generate a complement of the interpolated phase signal by providing a connection between a switching element of the third pair of switching elements and another output node and providing a connection between a switching element of the fourth pair of switching elements and the other output node.

19. The system of claim 18, wherein the third phase signal is a complement of the first phase signal, and the fourth phase signal is a complement of the second phase signal.

20. The system of claim 18, wherein the interpolator circuit is configured to:
   receive a select signal;
   select the third phase signal based on the received select signal;
   receive another select signal; and
   select the fourth phase signal based on the received other select signal.

21. The system of claim 18, wherein the interpolator circuit is configured to:
   enable a third switching element to provide the connection between the switching element of the third pair of switching elements and the other output node; and
   enable a fourth switching element to provide the connection between the switching element of the fourth pair of switching elements and the other output node.

* * * * *